United States Patent
Paronen

(10) Patent No.: US 8,690,580 B2
(45) Date of Patent: Apr. 8, 2014

(54) CANNULATION SIMULATOR

(75) Inventor: Mikael Paronen, Helsinki (FI)

(73) Assignee: Stiftelsen Arcada, Helsinki (FI)

( * ) Notice: Subject to any disclaimer, the term of this patent is extended or adjusted under 35 U.S.C. 154(b) by 209 days.

(21) Appl. No.: 13/124,840

(22) PCT Filed: Oct. 20, 2009

(86) PCT No.: PCT/FI2009/050844
§ 371 (c)(1),
(2), (4) Date: Apr. 19, 2011

(87) PCT Pub. No.: WO2010/046535
PCT Pub. Date: Apr. 29, 2010

(65) Prior Publication Data
US 2011/0200977 A1    Aug. 18, 2011

(30) Foreign Application Priority Data

Oct. 20, 2008 (FI) .................................. 20080329 U

(51) Int. Cl.
*G09B 23/28* (2006.01)
(52) U.S. Cl.
USPC ......................................................... 434/267
(58) Field of Classification Search
USPC .................................. 434/262, 267, 268, 272
See application file for complete search history.

(56) References Cited

U.S. PATENT DOCUMENTS

| | | | | |
|---|---|---|---|---|
| 2,871,584 A * | 2/1959 | Poole | ............................ | 434/268 |
| 2,995,832 A * | 8/1961 | Alderson | ...................... | 434/268 |
| 3,226,846 A * | 1/1966 | Wood | ............................. | 434/272 |
| 3,789,518 A * | 2/1974 | Chase | ............................ | 434/272 |
| 3,852,893 A * | 12/1974 | Smrcka | ......................... | 434/268 |
| 4,182,054 A * | 1/1980 | Wise et al. | ..................... | 434/268 |
| 5,215,469 A * | 6/1993 | Kohnke et al. | ................ | 434/268 |
| 5,839,904 A * | 11/1998 | Bloom | .......................... | 434/268 |
| 5,945,056 A * | 8/1999 | Day et al. | ....................... | 264/250 |
| 6,474,993 B1 * | 11/2002 | Grund et al. | .................... | 434/262 |
| 6,517,354 B1 * | 2/2003 | Levy | .............................. | 434/262 |
| 6,790,043 B2 * | 9/2004 | Aboud | .......................... | 434/268 |
| 7,272,766 B2 * | 9/2007 | Sakezles | ........................ | 714/742 |
| 7,306,465 B2 * | 12/2007 | White | ........................... | 434/268 |
| 7,534,107 B2 * | 5/2009 | Bardsley et al. | .............. | 434/272 |
| 7,857,626 B2 * | 12/2010 | Toly | .............................. | 434/267 |

FOREIGN PATENT DOCUMENTS

| | | |
|---|---|---|
| DE | 19716341 Y | 10/1998 |
| GB | 2164778 Y | 3/1986 |
| WO | WO9314483-X | 7/1993 |
| WO | WO 2008011675-X | 1/2008 |
| WO | WO2010046535 | 4/2010 |

* cited by examiner

*Primary Examiner* — Kurt Fernstrom
(74) *Attorney, Agent, or Firm* — Seppo Laine Oy; Joshua P. Wert

(57) ABSTRACT

A cannulation simulator. The simulator comprises a frame (1) shaped like a part of the human body, on the surface of which a cannulation zone (4) is arranged for insertion of a needle, in particular a cannulation needle. According to the invention, the cannulation zone (4) comprises a layer formed of a gel-like, at least essentially transparent polymeric material, which layer in regard to its mechanical properties at least approximately corresponds to human loose connective tissue, at least one vein simulating polymeric hose (5) arranged inside the polymeric material layer, as well as an elastic polymeric film (6) covering the polymeric material layer on the surface of the body. The simulator facilitates cannulation training.

10 Claims, 1 Drawing Sheet

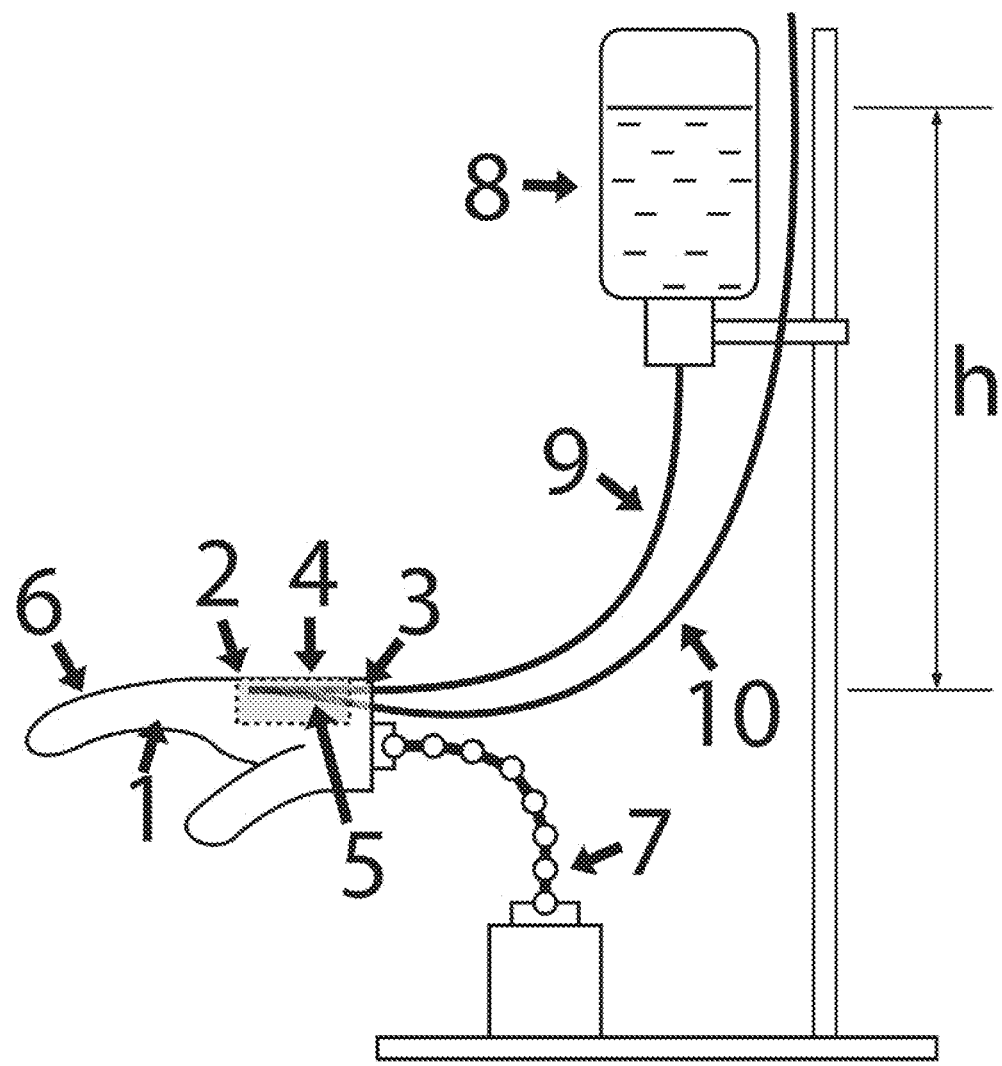

CANNULATION SIMULATOR

The present invention relates to a cannulation simulator according to the preamble of Claim 1.

This kind of simulator comprises generally a body at least approximately shaped like a human hand or another part of the human body, wherein a cannulation zone is formed, in particular for the insertion of a cannulation needle.

The present invention relates to a use according to Claim 9.

In cannulation it is essential to insert the cannula needle through the skin into a vein in a manner that allows dosing of required nutrients, blood or medicinal substances to a patient therethrough. This, as such simple procedure is impeded by variations in skin thicknesses and tenacities of the patients, the occasionally bad detection of veins, the impulsive force required for the insertion of the needle and the relatively thin layer thicknesses.

Therefore, in the education of health care personnel, such as nurses, public health nurses and medical doctors, mannequins or corresponding mechanical, so called cannulation simulators are used in order to train outside the body (ex vivo) the insertion of an injection needle, in particular cannulation performed on the back of a hand.

As auxiliary means for practical training a body piece similar to a member of the body, for instance an arm or a back of a hand, are used, into which the needle can be inserted.

Previous solutions are based on the use of relatively hard plastics and particularly on poorly water absorbing materials. Conventional thermoplastics (polyethylene and polypropylene, polyvinyl chloride) as well as different rubber qualities have been used as constructional materials.

In practice, the cannulation simulators produced so far are perceived as bulky, their weights are relatively low in comparison with the weight of a human arm, and there are severe limitations with regard to the movability into the right entering angle and the reaching of the right position. Furthermore, due to the synthetic and water-free materials used, the utilization response of simulators used until now has been poor in relation to different human skin layers and veins. In practice, a poor response means that an either abnormal big or small force is required for penetrating different layers. Furthermore, due to a relatively big friction between the cannula needle and the simulator, the cannula needle moves relatively poorly in synthetic materials.

The object of the present invention is to eliminate at least a part of the disadvantages associated with the prior art and to provide a cannulation simulator of an entirely novel type.

The invention is based on the idea that a cannulation zone formed in the frame of a cannulation device comprises or consists of a polymeric material, which with respect to the cannulation needle mechanically behaves like loose connective tissue of a human being (or another animal—henceforth "cannulation object"). The term "loose connective tissue" refers in the present invention to tissues, which by the cannulation needle in normal use are perforated in connection with the insertion of the needle. Thus, also muscular tissues and corresponding tissues which are not a part of the skeleton of the cannulation object are case-specifically also referred to as "loose connective tissues".

According to the invention the material is most advantageously a macromolecular material. A vein simulating, in particular flexible hose or a part of a hose is then preferably embedded into the cannulation object. Furthermore, the cannulation zone is covered with a separate polymer film, which simulates the skin of the cannulation object. Due to the generally elastic characteristics of skin, this kind of polymer film is advantageously produced of elastomeric material.

On the basis of the above mentioned, the cannulation simulator according to the present invention is mainly characterized by what is stated in the characterizing part of the Claim 1.

Considerable advantages can be achieved with the present invention. Thus, the invention allows more natural cannulation training than with any of the presently available ones. The penetration response and the gliding of the needle provided for by the new material options are almost identical to the natural corresponding ones. Furthermore, the distinct production of a loose connective tissue and muscle zone of the cannulation zone produced for each training situation, provides for a free choice of the dimensions of the vein simulators out of commercially available materials.

According to a preferred embodiment of the invention the frame of a cannulation device is attached to a flexible supporting arm simulating the natural trajectories of a member of a body, especially an arm, of the cannulation object (in particular of a human being).

According to another preferred embodiment a cannulation hose is connected to a separate fluid container for conducting fluid into the hose, in which case by disposing the fluid container at a higher level than the cannulation zone, it is easy to adjust the overpressure in the hose by varying the altitude of the container, which allows a continuous adjustment of the overpressure. An applicable viscose blood simulator allows extensive practical training without any excessive leakage from the simulator.

The cannulation simulator is formed of several independently inventive parts as well as their innovative combination.

In the following, the invention will be examined with the help of a detailed description with references to the accompanying drawing. The drawing shows the basic structure of a cannulation device which is attached to a supporting arm and a fluid container viewed from the side.

The anatomic basic structure of the cannulation simulator is formed of a frame, which in the FIGURE is a part of an arm model 1, which is manufactured of a sufficiently thick material; advantageously such that it forms an almost or a completely solid piece. Furthermore, on the back of the hand 2 of the arm part a cavity is made, wherein the actual cannulation part is placed. The cavity forms a cannulation zone. From the cavity there are also conducting channels 3 (partly open or completely covered) allowing a free feeding and a possible pulsing of fluid to the cannulation zone.

The actual cannulation matrix 4 arranged in the cannulation zone is typically rectangular, circular or oval-shaped and is during the production provided with a vein simulating hose 5 produced of a relatively thin elastic material. The external diameter and the thickness of the wall of the hose is selected according to the training purpose and when simulating an average case it can be a silicone hose with an external diameter of 5 mm and a wall thickness of 0.5 mm.

The material around the hose is preferably selected so that it corresponds as exactly as possible to human loose connective tissue and muscular tissue. Because of this, polymers that create 3-dimensional molecular network structures already at relatively small concentrations are especially advantageous. Materials of this type are, for instance, different materials creating compositions known as hydrogel (starch and cellulose-based substances, different kinds of saccharides and polysaccharides, gelatins and gelatin-like substances, polyvinyl pyrrolidone, polyacrylamide, poly-2-hydroxyethyl-methacrylate etc. as well as their derivatives and mixtures).

A skin simulating material 6 is arranged partly upon the arm part and totally over the cavity of the back of the hand, which should as closely as possible correspond to the characteristics of human skin. This means a relatively high needle penetration resistance, translucency, small material thickness, and sufficient elasticity.

In a preferred embodiment the skin simulator can be implemented by means of commercial products sold as disposable gloves. In this context one should pay special attention to the material thickness and the material hardness. Consequently, conventional rubber household gloves produced for domestic use are too thick. Therefore, protective gloves that are generally used in hospitals and laboratories and are manufactured of a rubber-like substance should be chosen as skin simulator and which, when put on, are relatively close-fitting on the hand, and according to this embodiment of the present invention, on a cannulation simulator. Thus, the protective glove feels on the simulator like a skin-like layer and by tightening it the vein or veins beneath it will be distinguished easier from the surrounding tissue and thus the chance to succeed in adjusting the cannula into the right place will be better. Suitable materials for implementing the skin simulator by means of a protective glove are natural rubber, nitrile-rubber and other known materials used in the production of protective gloves (generally elastomeric polymers as well as thermoplastic elastomers, TPE).

The thickness of a (non-stretched) film is typically approx. 1-250 micrometers, particularly approx. 5-200 micrometers, preferably approx. 10-150 micrometers.

The arm simulator is attached together with the cannulation zone simulator and the skin simulator to an applicable flexible holder 7, which allows for wide and relatively unlimited trajectories corresponding to the human arm. Due to this, the supporting structure has to contain as many joints as possible and the rigid part remaining between each joint have to be as short as possible. The flexible holder can be attached either with magnets or alternatively by means of, e.g. screws to a worktable or a separate cannulation surface.

According to the preferred embodiment of the FIGURE the cannulation simulator also comprises a separate blood source 8, from which a blood simulator (colored fluid) is fed through conducting hoses to the simulating zone. The feeding of fluid is mainly carried out through a hose 9 and the adjustment of the fluid-level takes place through hose 10. The blood source is arranged, when needed, higher than the actual cannulation point in order to create a slight overpressure, by which a normal flow of blood and substances fed into the cannula can be simulated.

The artificial blood used in the simulator is produced of water, red color dye and a thickener. The purpose of the thickener is to increase the viscosity of the artificial blood so that repeatedly performed training with the same simulator will not cause significant leakage of the artificial blood but simultaneously, however, allowing the movability of the artificial blood, e.g. into a cannula needle. The required increase in the viscosity can partly or completely be obtained by the use of the same components as is earlier mentioned in connection with the composition of both the loose connective tissue and muscle simulator of the cannulation matrix.

The invention claimed is:

1. A cannulation simulator comprising;
   a frame shaped like a part of the human body having, on the surface of said frame, a cannulation zone arranged for the insertion of a needle, and
   wherein the cannulation zone comprises a polymeric material layer formed of a gel-like translucent polymeric material and wherein the polymeric material layer's mechanical properties correspond to human loose connective tissue, at least one vein simulating polymeric hose arranged inside the polymeric material layer, and an elastic polymeric film covering the polymeric material layer on the surface of the frame.

2. The cannulation simulator according to claim 1, wherein the polymeric material consists of a hydrogel.

3. The cannulation simulator according to claim 1, wherein the polymeric material is a material creating 3-dimensional molecular network structures, chosen from the group of: starch and cellulose-based substances, saccharides and polysaccharides, gelatins, polyvinyl-pyrrolidone, polyacrylamide, poly-2-hydroxyethylmethacrylate as well as their derivatives and mixtures thereof.

4. The cannulation simulator according to claim 1, wherein the polymeric hose is a silicone material and corresponds to a human vein with respect to its important mechanical properties in the cannulation operation.

5. The cannulation simulator according to claim 4, wherein the polymeric hose is attached to a container wherefrom colored fluid can be led in order to simulate blood flowing in a vein.

6. The cannulation simulator according to claim 5, wherein the altitude of the container is adjustable in order to regulate the pressure of the fluid flowing in the hose.

7. The cannulation simulator according to claim 1, wherein the elastic polymeric film is an elastomer or a thermoplastic elastomer.

8. The cannulation simulator according to claim 1, wherein the frame is attached to a flexible supporting arm which simulates the natural trajectories of the part of the human body of the cannulation object.

9. The cannulation simulator according to claim 1, wherein the elastic polymeric film is a disposable glove.

10. The cannulation simulator according to claim 1, wherein the translucence of the elastic polymeric film increases when the elastic polymeric film is tightened.

* * * * *